United States Patent
Twu et al.

(10) Patent No.: US 6,818,340 B2
(45) Date of Patent: Nov. 16, 2004

(54) CAPILLARY TRANSPORTING FUEL BATTERY

(75) Inventors: Hung-Sen Twu, Taipei Hsien (TW); Ming-Jye Tsai, Hsin-Chu Hsien (TW); Chia Lin Wu, Tao-Yuan Hsien (TW); Lieh-Hsi Lo, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 229 days.

(21) Appl. No.: 09/948,558

(22) Filed: Sep. 10, 2001

(65) Prior Publication Data
US 2003/0049512 A1 Mar. 13, 2003

(51) Int. Cl.[7] ............................. H01M 8/02; H01M 4/86
(52) U.S. Cl. ............................. 429/34; 429/42; 429/44
(58) Field of Search .................... 429/34, 38, 39, 429/42, 44

(56) References Cited

U.S. PATENT DOCUMENTS 4,407,904 A * 10/1983 Uozumi et al. ............... 429/26
2002/0058175 A1 * 5/2002 Ruhl ............................. 429/32
2003/0143444 A1 * 7/2003 Liu et al. ....................... 429/19

FOREIGN PATENT DOCUMENTS

JP 07006776 A * 1/1995 ............ H01M/8/02

* cited by examiner

Primary Examiner—Gregg Cantelmo
(74) Attorney, Agent, or Firm—Bacon & Thomas

(57) ABSTRACT

The present invention is to provide a kind of capillary transporting fuel battery, wherein on two sides of two fuel battery substrates faced to each other it forms a gap with an appropriate distance, two sides of those two fuel battery substrates are a "liquid fuel side" and an oxygen-containing gas side, two inner sides faced to each other are liquid fuel sides and two outer sides are oxygen-containing gas sides. By using three liquid isolating layer it connects two long sides and one wide side of two fuel battery substrates faced to each other with an appropriate gap, among them the gap of two fuel batteries faced to each other is reduced to an appropriate range, it can be visualized as a capillary having a transporting fuel function to form a capillary channel, through the process described above it assembles a battery unit, by using plural sets of battery units it forms a transporting fuel battery utilizing a capillary phenomenon.

11 Claims, 1 Drawing Sheet

CAPILLARY TRANSPORTING FUEL BATTERY

BACKGROUND OF INVENTION

1. Field of Invention

The present invention is to provide a kind of capillary transporting fuel battery, wherein the gap of two fuel battery substrates is reduced to an appropriate range, it can be visualized as a capillary having a transporting fuel function to form a capillary transporting fuel battery, which can improve the known technique by use of a pump to transport the fuel, and also reduce unnecessary transporting fuel pipes, and minimize the battery volume.

2. Background of Invention

In the present high technique products such as cellular phone, notebook computer, global position system (GPS), personal digital assistant (PDA), and B. B. Call etc., especially in recent years those high technique products become more popular and more competitive in the market, the requirements for them should be small volume, convenient to carry, and also possessing high efficiency.

Typically, the raw materials of the general fuel battery are hydrogen gas and oxygen gas, wherein they are proceeding the chemical reaction at the high temperature by using the device of generating power, for the fuel supply and transporting oxygen gas can be provided from air and hydrogen gas can be extracted from methanol, ethanol, and natural gas etc. hydrocarbon compounds fuel, among them the fuel is put into the fuel battery by use of a pump.

In the known conventional fuel battery reaction, it almost utilizes a pump to put the fuel into the pipes to transport the fuel, however, for the present new technique products the demands of the composed elements should be simplified and the volume should be minimized, putting a very small amount of fuel by use of a pump is not able to be easily controlled, and also has difficult problems of technique.

SUMMARY OF THE INVENTION

Hence, the aim of the present invention is to solve the drawbacks described above. In order to avoid the presence of the drawbacks described above, the present invention is to provide a kind of capillary transporting fuel battery, wherein the gap of two fuel battery substrates is reduced to an appropriate range, it can be visualized as a capillary having a transporting fuel function to form a capillary transporting fuel battery, wherein it improves the known technique by using a pump to transport the fuel, and also reduces unnecessary transporting fuel pipes, and minimizes the battery volume.

In order to obtain the aim described above, the present invention is to provide a kind of capillary transporting fuel battery, wherein between two fuel battery substrates faced to each other it forms a gap with an appropriate distance, two sides of those two fuel battery substrates are a liquid fuel side and an oxygen-containing gas side, two inner sides faced to each other are liquid fuel sides and two outer sides are oxygen-containing gas sides. By using three liquid isolating layer it connects two long sides and one wide side of two fuel battery substrates faced to each other with an appropriate gap, among them the gap of two fuel batteries faced to each other is reduced to an appropriate range, it can be visualized as a capillary having a transporting fuel function to form a capillary channel, through the process described above it assembles a battery unit, by using plural sets of battery units it forms a transporting fuel battery utilizing a capillary phenomenon, wherein it improves the known technique by using a pump to transport the fuel, and also reduces unnecessary transporting fuel pipes, and minimizes the battery volume.

BRIEF DESCRIPTION OF THE DRAWINGS

Detailed description and technique contents of the present invention will be described by the accompanying drawings as follows.

DETAILED DESCRIPTION OF THE PREFERRED EMBODIMENTS

Figure 1A:
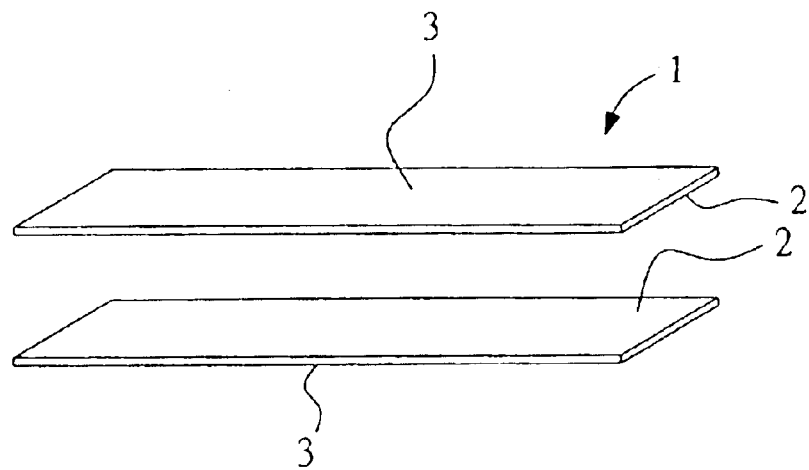
FIGS. 1a, 1b, and 1c illustrate the cross-sectional views of the manufacturing process for the present invention of capillary transporting fuel battery.
Figure 1B:
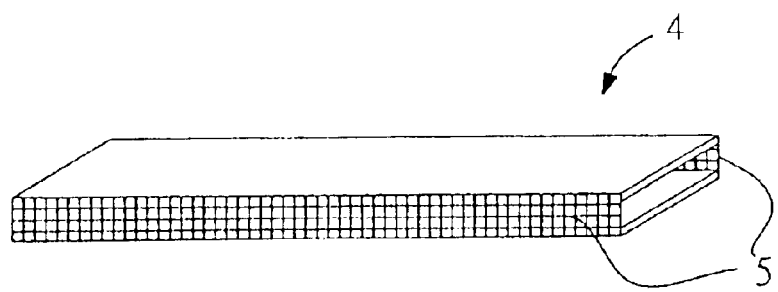
Figure 1C:
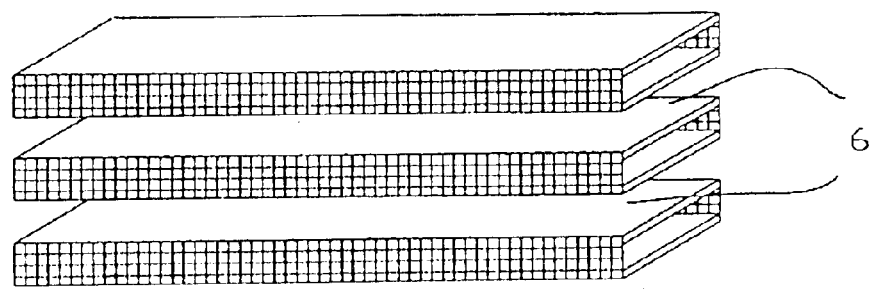

FIGS. 1a, 1b, and 1c illustrate the cross-sectional views of the manufacturing process for the present invention of capillary transporting fuel battery. FIG. 1a illustrates between two fuel battery substrates 1 faced to each other it forms a gap with an appropriate distance, two sides of those two fuel battery substrates 1 are a liquid fuel side 2 and an oxygen-containing gas side 3, two inner sides faced to each other are liquid fuel sides 2 and two outer sides are oxygen-containing gas sides 3, among them the liquid fuel side 2 of two fuel battery substrates 1 can be wrinkled to increase the surface areas. When the gap between two fuel battery substrates 1 faced to each other is reduced to an appropriate range, it can be visualized as a capillary having a transporting function to form a capillary channel 6, among them the gap between two fuel battery substrates 1 faced to each other can be a range of 10~1000 $\mu$m, the fuel battery substrate 1 material can be polymer, silicon wafer, and metal oxides, the thickness of the fuel battery substrate 1 is 10~1000 $\mu$m. FIG. 1b illustrates by using diffusion bounding, heated pressure, adhering, and soldering method the three liquid isolating layer 5 can be connected to two long sides and one wide side of two fuel battery substrates 1 faced to each other with an appropriate gap. The function of the three liquid isolating layer 5 is to avoid the leak of liquid fuel from the gap between the fuel battery substrates 1, the material of the liquid isolating layer 5 can be selected from polymer, porous metal, porous nonmetal, and nonmetal composite, through the process described above it forms a battery unit 4. FIG. 1c illustrates by using plural sets of the battery units 4 it forms a transporting fuel battery by use of the capillary phenomenon, it improves the known technique by using a pump to transport the fuel, and also reduces unnecessary transporting fuel pipes, and minimizes the battery volume.

The present invention specially discloses and describes selected the best examples. It is to be understood, however, that the present invention is not limited to the specific features shown and described. The invention is claimed in any forms or modifications within the spirit and the scope of the appended claims.

What is claimed is:

1. A capillary transporting fuel battery comprising:

multiple battery units;

each of said units comprises two fuel battery substrates, each substrate having a liquid fuel side and an oxygen-containing gas side, wherein the liquid fuel sides of each substrate face each other and form a gap which acts as a capillary channel to transport fuel;

wherein the gap between the two fuel battery substrates is between 10~1000 μm; and a liquid isolating layer connected to three sides of the two substrates maintaining the gap between the substrates and avoiding leakage of liquid fuel from the gap between the substrates and to form with the substrates said battery unit.

2. The capillary transporting fuel battery of claim 1 wherein the each battery substrate is a polymer, a silicon wafer or a metal oxide.

3. The capillary transporting fuel battery of claim 1 wherein each substrate has a thickness of between 10~100 μm.

4. The capillary transporting fuel battery of claim 2 wherein each substrate has a thickness of between 10~100 μm.

5. The capillary transporting fuel battery of claim 1 wherein the liquid isolating layer is a polymer, porous metal, porous nonmetal and nonmetal composite.

6. The capillary transporting fuel battery of claim 2 wherein the liquid isolating layer is a polymer, porous metal, porous nonmetal and nonmetal composite.

7. The capillary transporting fuel battery of claim 3 wherein the liquid isolating layer is a polymer, porous metal, porous nonmetal and nonmetal composite.

8. The capillary transporting fuel battery of claim 4 wherein the liquid isolating layer is a polymer, porous metal, porous nonmetal and nonmetal composite.

9. The capillary transporting fuel battery of claim 1 liquid isolating layer is a polymer, porous metal, porous nonmetal and nonmetal composite.

10. The capillary transporting fuel battery of claim 2 wherein the liquid isolating layer is a polymer, porous metal, porous nonmetal and nonmetal composite.

11. The capillary transporting fuel battery of claim 3 wherein the liquid isolating layer is a polymer, porous metal, porous nonmetal and nonmetal composite.

* * * * *